United States Patent
Tanaka

(10) Patent No.: US 8,704,111 B2
(45) Date of Patent: Apr. 22, 2014

(54) SUCTION-TYPE ROBOT HAND WITH WEIGHT MEASUREMENT FUNCTION

(75) Inventor: Yasuyoshi Tanaka, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/535,946

(22) Filed: Jun. 28, 2012

(65) Prior Publication Data
US 2013/0025946 A1    Jan. 31, 2013

(30) Foreign Application Priority Data

Jul. 27, 2011   (JP) ................................. 2011-163807

(51) Int. Cl.
*B25J 15/06*     (2006.01)
*G01G 19/52*    (2006.01)
*G01G 21/23*    (2006.01)

(52) U.S. Cl.
USPC ............. 177/245; 901/46; 294/183; 294/188; 414/627

(58) Field of Classification Search
USPC ..................... 901/46; 294/183, 188; 414/627; 177/245, DIG. 9
See application file for complete search history.

(56) References Cited

U.S. PATENT DOCUMENTS

| | | | | |
|---|---|---|---|---|
| 5,422,554 A | * | 6/1995 | Rohde | 318/568.21 |
| 6,166,336 A | * | 12/2000 | Odiet | 177/210 R |
| 6,240,628 B1 | * | 6/2001 | Yoshida et al. | 29/740 |
| 6,851,914 B2 | * | 2/2005 | Hirata | 414/627 |
| 6,881,907 B2 | * | 4/2005 | Winkelmolen | 177/145 |
| 7,261,350 B2 | * | 8/2007 | Isetani et al. | 294/185 |

FOREIGN PATENT DOCUMENTS

| | | |
|---|---|---|
| JP | 61-166787 | 7/1986 |
| JP | 05-016047 | 1/1993 |
| JP | 5-16047 | 3/1993 |
| JP | 06-107394 | 4/1994 |
| JP | 6-107394 | 4/1994 |
| JP | 08-094424 | 4/1996 |
| JP | 2008-207263 | 9/2008 |

* cited by examiner

*Primary Examiner* — Randy W Gibson
(74) *Attorney, Agent, or Firm* — Drinker Biddle & Reath LLP

(57) ABSTRACT

A robot hand (20) and has: a measurement instrument (22); a hollow shaft unit (24b) attached to a distal end of the measurement instrument coaxially with the distal shaft; a suction unit (26) attached to a distal end of the hollow shaft unit and holds the object; a hollow member (32) that surrounds the hollow shaft unit rotatably in the circumferential direction; a hollow member connecting unit (31, 31a) that extends from a casing (12) supporting the distal shaft (11) and is connected to the hollow member; and a suction unit drive unit (37, 42) that is connected to the hollow member in a position corresponding to the peripheral surface of the hollow shaft unit and drives the suction unit, and the suction unit drive unit communicates with the inner space of the hollow shaft unit through one opening (25).

12 Claims, 4 Drawing Sheets

SUCTION-TYPE ROBOT HAND WITH WEIGHT MEASUREMENT FUNCTION

RELATED APPLICATION DATA

This application claims priority under 35 U.S.C. §119 and/or §365 to Japanese Application No. 2011-163807 filed Jul. 27, 2011, the entire contents of which are incorporated herein by reference.

BACKGROUND OF THE INVENTION

1. Field of the Invention

The present invention relates to a suction-type robot hand with a weight measurement function, which measures the weight of an object to be held.

2. Description of Related Arts

Various models of suction devices that suck and hold an object have been known heretofore. For example, Japanese Unexamined Patent Publication No. 06-107394 discloses a suction device, in which a suction pad slides and moves in the direction in which its suction is applied, with respect to a suction chamber. This suction device measures the weight of an object that is hanged by the sliding operation of the suction pad. Furthermore, Japanese Utility Model Publication No. 05-016047 discloses a suction device that sucks one plate member with a plurality of suction nozzles.

However, when the suction pad disclosed in Japanese Unexamined Patent Publication No. 06-107394 holds an object that is difficult to suck up by the suction pad in an airtight manner, not only unnecessary suction power is required, but, the weight of such an object also cannot be measured adequately. Also, referring to Japanese Utility Model Publication No. 05-016047, to change the posture of an object, the positions of a plurality of suction nozzles have to be changed. In such a case, the positions and postures of pipes that extend to the suction nozzles respectively need to be changed, and, as a result of this, there is possibility that the weight of an object to be measured changes.

The present invention has been made taking into account the above concerns, and it is therefore an object of the present invention to provide a suction-type robot hand that can adequately measure the weight of an object that is difficult to suck in an airtight manner.

SUMMARY OF THE INVENTION

To achieve the above-stated object, according to the first aspect, a robot hand is provide that is attached to a robot arm and that has a function of measuring the weight of an object that is held by suction, and this robot hand has: a measurement instrument that is attached to the distal end of a distal shaft of the robot arm and measures the weight of the object; a hollow shaft unit that is attached to the distal end of the measurement instrument coaxially with the distal shaft of the robot arm; a suction unit that is attached to the distal end of the hollow shaft unit and holds the object by suction; a hollow member that surrounds the hollow shaft unit rotatably in the circumferential direction; a hollow member connecting unit that extends from the casing supporting the distal shaft of the robot arm and is connected to the hollow member; and a suction unit drive unit that is connected to the hollow member in a position corresponding to the peripheral surface of the hollow shaft unit and drives the suction unit, and the suction unit drive unit communicates with the inner space of the hollow shaft unit through at least one opening unit that is formed in the peripheral surface of the hollow shaft unit.

According to a second aspect, the second aspect further has, in addition to the first aspect, an umbilical member fixing unit that is attached to the hollow member connecting unit and fixes an umbilical member that drives the measurement instrument.

According to a third aspect, based on the first aspect, the suction unit drive unit has a vacuum generator that is attached to the hollow member.

According to a fourth aspect, based on the first aspect, two holes through which the hollow shaft unit penetrates are formed in the hollow member, and the two holes are made to have equal areas.

According to a fifth aspect, the fifth aspect further has, in addition to the first aspect, seal members that are placed between the two holes in the hollow member and the hollow shaft unit.

According to a sixth aspect, based on the second aspect or the fifth aspect, the hollow member connecting unit is a waterproof structure that surrounds an entirety of the measurement instrument.

According to a seventh aspect, the seventh aspect further has, in addition to the first aspect, a bearing that is placed between the hollow member connecting unit and a casing that supports the distal shaft of the robot arm.

Although the present invention has been described using typical embodiments, a person skilled in the art should understand that the above-described changes, and various other changes, omissions, and additions are possible without departing from the scope of the present invention.

DETAILED DESCRIPTION

Embodiments of the present invention will be described below in detail with reference to the accompanying drawings. In the following drawings, the same members are assigned the same reference codes. The scale in these drawings is changed as appropriate for ease of explanation.

Figure 1:
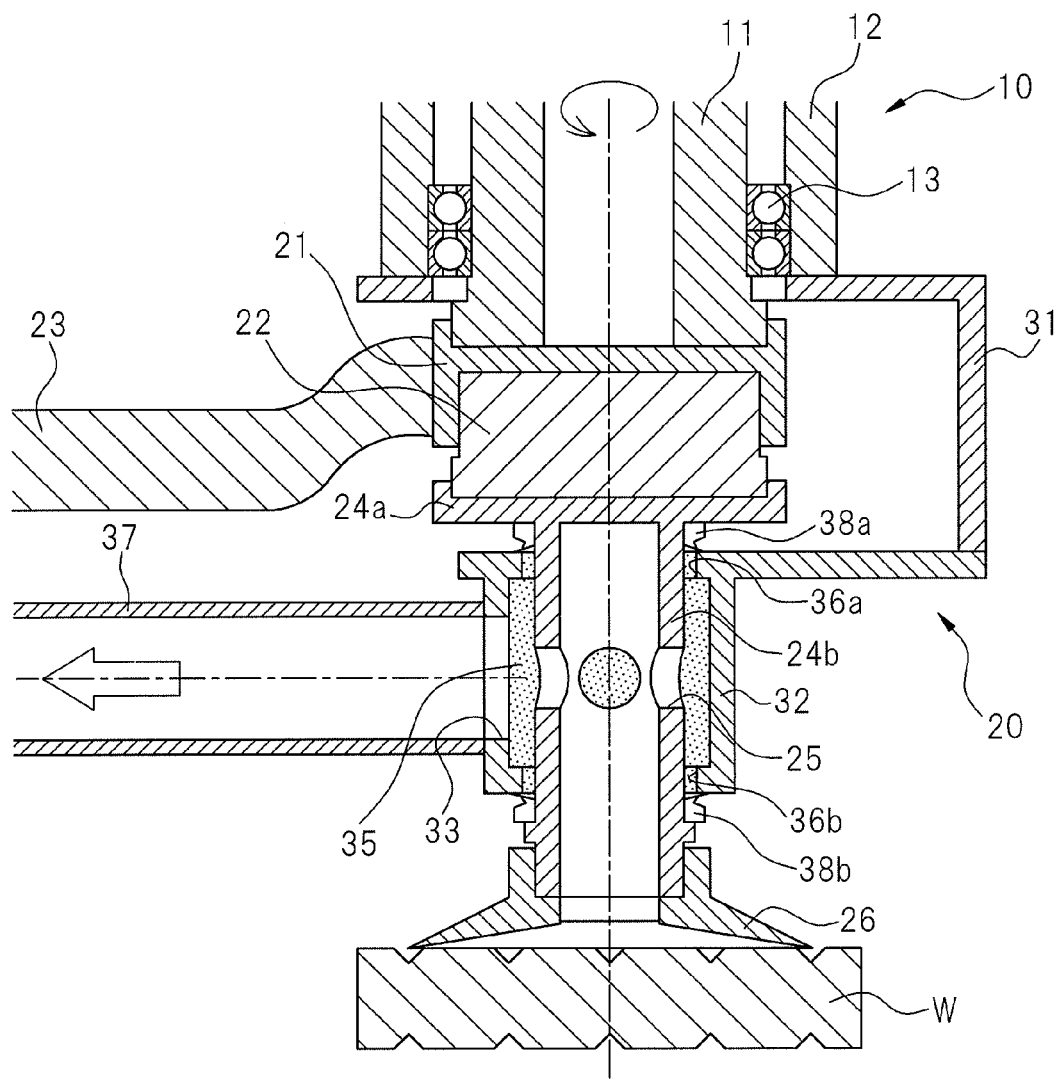
FIG. 1 is a cross sectional view of a robot hand based on a first embodiment of the present invention.

FIG. 1 is a cross sectional view of a robot hand based on the first embodiment of the present invention. As illustrated in FIG. 1, a distal shaft 11 of a robot 10, which is, for example, an articulated robot, is able to rotate around a housing 12 by means of a bearing 13. Then, a robot hand 20 is attached to the distal end of the distal shaft 11.

To be more specific, a measurement instrument connecting unit 21 having a cross sectional shape of the letter H is fitted in at the distal end of the distant shaft 11. Then, a measurement instrument 22, which measures the weight of workpiece W (described later), is fitted into the distal end side of the measurement instrument connecting unit 21. Consequently, as can be seen from FIG. 1, the measurement instrument 22 is placed coaxially with the distal shaft 11. Then, a measurement instrument cable 23 extends from the peripheral surface of the measurement instrument 22. Assuming that this measurement instrument cable 23 is connected to a robot control device (not illustrated).

As illustrated in FIG. 1, a flange-model connecting unit 24a is fitted in at the distal end of the measurement instrument 22. From the flange-model connecting unit 24a, a hollow shaft unit 24b, which is formed integrally with the flange-model connecting unit 24a, extends coaxially with the distal shaft 11. As illustrated in the drawing, the proximal end of the hollow shaft unit 24b is closed by the flange-model connecting unit 24a, and the distal end of the hollow shaft unit 24b is open. Also, in the peripheral surface of the hollow shaft unit 24b, a plurality of openings 25 are formed in the circumferential direction. In FIG. 1, a plurality of round-shaped openings 25 are formed at equal intervals, but the number and shape of the openings are by no means limited to the ones illustrated in the drawing.

Furthermore, at the distal end of the hollow shaft unit 24b, a suction unit 26 is attached. An opening is formed in the suction unit 26 and communicates with the inner space of the hollow shaft unit 24b. The suction unit 26 is preferably a suction pad. Then, the suction unit 26 is connected to a vacuum source, which is, for example, a vacuum pump (not illustrated), via a pipe (described later), and a suction effect is produced in the suction unit 26 by means of the vacuum source.

Furthermore, in FIG. 1, workpiece W to be sucked and held by the suction unit 26 is illustrated. As illustrated in the drawing, the surface of workpiece W is not flat, and, for example, a plurality of indentations are formed. Consequently, when the workpiece W is simply sucked and held by the suction unit 26, there is a possibility that air leaks through the indentations. The robot hand 20 of the present invention stably sucks and holds even such workpiece W and measures its weight. Obviously, the surface of workpiece W may be flat as well.

In FIG. 1, around the hollow shaft unit 24b, the hollow member 32 is placed coaxially therewith, and surrounds the hollow shaft unit 24b rotatably in the circumferential direction. With the embodiment illustrated in FIG. 1, an annular chamber 35 is formed between the hollow shaft unit 24b and the hollow member 32. However, the hollow shaft unit 24b and the hollow member 32 may be placed close to each other to a degree in which the annular chamber 35 cannot be formed. Then, a single opening 33 is formed in the peripheral surface of the hollow member 32. In the opening 33, the pipe 37 for driving the suction unit 26 is connected.

Furthermore, as can be seen from FIG. 1, holes 36a and 36b are formed in the upper end and the lower end of the hollow member 32, respectively. The hollow shaft unit 24b penetrates the hollow member 32 through these two holes 36a and 36b. These holes 36a and 36b are mutually coaxial and have the same shape. Consequently, when the robot hand 20 is driven, the forces that are produced in the holes 36a and 36b by negative pressure cancel each other. Therefore, the forces produced in the holes 36a and 36b by negative pressure have no influence upon the measurement of the weight of workpiece W.

Furthermore, as illustrated in FIG. 1, sealing members 38a and 38b are placed between the hollow shaft unit 24b and the hollow member 32. Consequently, even when workpiece W is comparatively frail, it is possible to avoid the situation where part of workpiece W enters inside the hollow member 32. This is especially effective when workpiece W is food.

As illustrated in FIG. 1, a hollow member connecting unit 31 extends from the casing 12 of the distal shaft 11. This hollow member connecting unit 31 extends outwardly in the radial direction, then extends in a direction away from the distal shaft 11, then extends inwardly in the radial direction, and connects with the hollow member 32. The hollow member connecting unit 31 may be connected to a flange (not illustrated) that is formed in the hollow member 32. Also, as can be seen from FIG. 1, the hollow member 32 is held primarily by the casing 12 via the hollow member connecting unit 31.

When the robot hand 20 is driven, the vacuum source (not illustrated) drives, and air is sucked in, through the suction unit 26, hollow shaft unit 24b, opening 25, chamber 35 and pipe 37, in order. By this means, a suction effect is produced in the suction unit 26 and workpiece W is sucked.

As can be seen from FIG. 1, the measurement instrument 22 is positioned in the proximal end side of the hollow shaft unit 24b. In contrast with this, the air flows into the pipe 37 through the opening 25 formed in the peripheral surface of the hollow shaft unit 24b. Consequently, the measurement instrument 22 itself is free from the influence of negative pressure related to the suction unit 26.

In the event indentations are formed on the surface of workpiece W as illustrated in FIG. 1, it is not possible to maintain airtightness upon suction. However, as described earlier, the present invention is designed so that the measurement instrument 22 is not directly influenced by suction. Consequently, even in the event airtightness cannot be maintained perfectly, the measurement instrument 22 is able to measure the weight of workpiece W adequately.

Furthermore, in the event the pipe 37 is directly connected to the hollow shaft unit 24b between the measurement instrument 22 and workpiece W, the external force that applies to the pipe 37, while the robot is in operation, influences the measurement instrument 22, and there is a possibility that the weight of workpiece W cannot be measured accurately. However, with the present invention, as illustrated in FIG. 1, the pipe 37 is not connected directly to the hollow shaft unit 24b that is engaged with the measurement instrument 22 but is connected to the hollow member 32 around the hollow shaft unit 24b. Thus, even in the event external force is applied to the pipe 37 upon measurement, the external force has no influence upon the weight of workpiece W. Consequently, it is obvious that the weight of workpiece W can be measured more adequately.

Furthermore, with the present invention, it is possible to hold workpiece W and measure its weight, so that it is not necessary to measure the weight of workpiece W in separate steps, and it is therefore possible to reduce the total processing time of the workpiece. Furthermore, it is possible to supply the weight of workpiece W to the robot control device (not illustrated), and, according to the measured weight, easily change the destination to which workpiece W is transported, and therefore select workpiece W easily.

Also, given that the hollow member 32 is freely rotatable with respect to the hollow shaft unit 24b, even when the distal shaft 11 rotates around the casing 12, the pipe 37 does not follow the operation of the distal shaft 11. Consequently, when the robot 10 is in operation, it is possible to significantly reduce the possibility that the pipe 37 interferes with the peripheral equipment (not illustrated).

Figure 2:
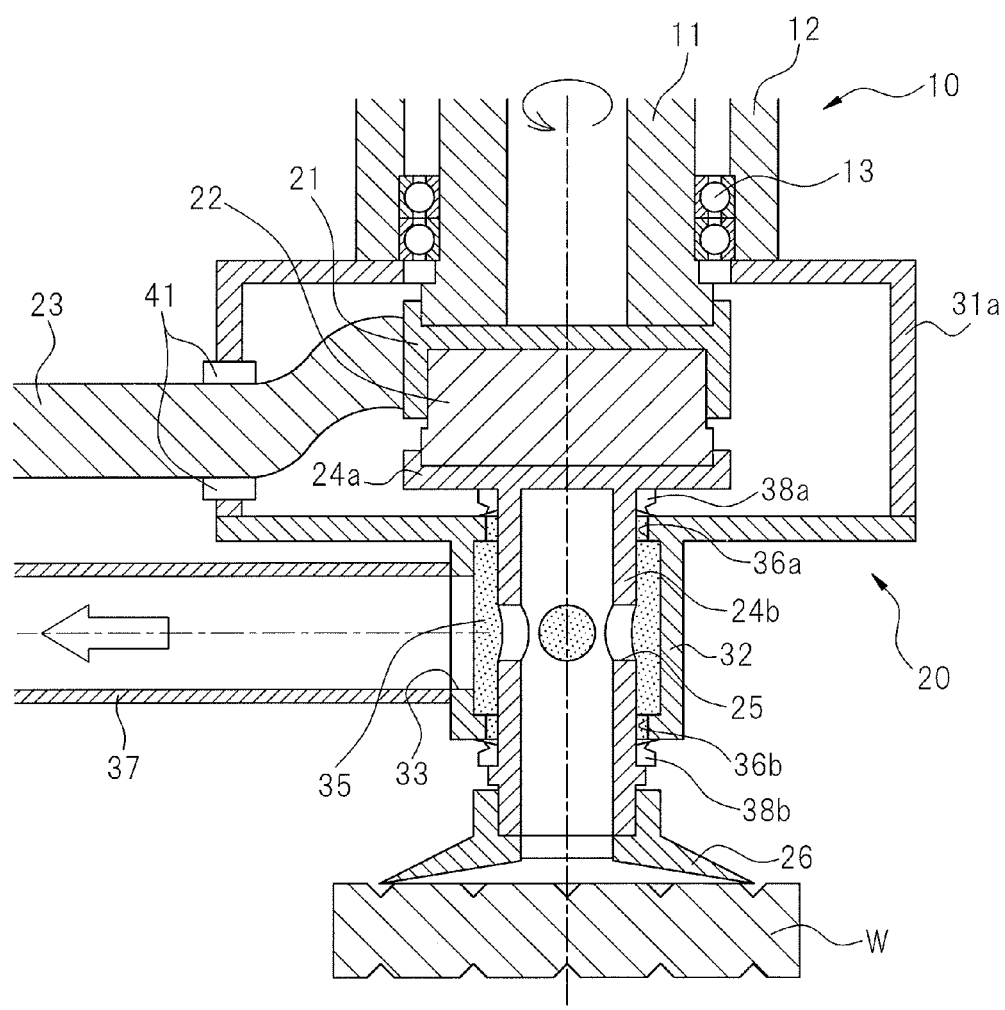
FIG. 2 is a cross sectional view of a robot hand based on a second embodiment of the present invention.

FIG. 2 is a cross sectional view of a robot hand according to a second embodiment of the present invention. In the following, differences from the first embodiment illustrated in FIG. 1 will be explained mainly. With the embodiment illustrated in FIG. 2, a hollow member connecting unit 31a that extends from the casing 12 of the distal shaft 11 is formed to surround the entirety of the measurement instrument 22.

Then, the measurement instrument cable 23 extends through an opening formed in the peripheral surface of the hollow member connecting unit 31a. As illustrated in the drawing, the measurement instrument cable 23 is fixed to the hollow member connecting unit 31*a* by means of a measurement instrument cable fixing unit 41 that is placed around this opening. However, considering that the measurement instrument 22 rotates, the measurement instrument cable 23 preferably has certain margin inside the hollow member connecting unit 31*a*. By means of this measurement instrument cable fixing unit 41, it is possible to prevent the measurement instrument cable 23 from being swung around, and prevent the measurement instrument cable 23 from interfering with the peripheral equipment.

As described earlier, the sealing members 38*a* and 38*b* are placed between the hollow shaft unit 24*b* and the hollow member 32. Then, it is preferable to perform the same sealing processing for the measurement instrument cable fixing unit 41. In this case, the hollow member connecting unit 31*a* can be made a water-proof structure that protects the measurement instrument 22 entirely.

In the event workpiece W is food, it is necessary to wash with fluid and keep the suction unit 26 of the robot hand 20 and its surrounding parts clean. In the event workpiece W is food, this is obviously and especially effective because the robot hand 20 of a water-proof structure can be washed with fluid.

Figure 3:
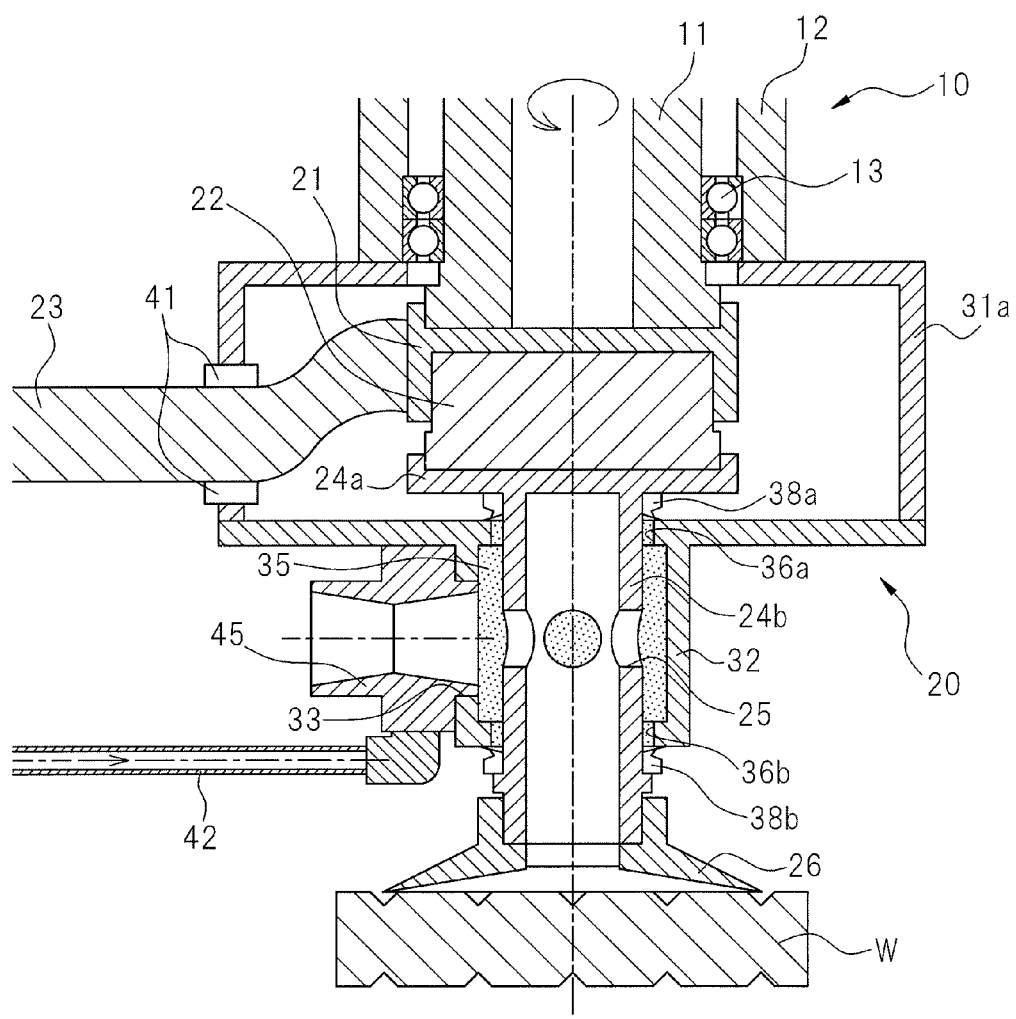
FIG. 3 is a cross sectional view of a robot hand based on a third embodiment of the present invention.

FIG. 3 is a cross sectional view of a robot hand according to a third embodiment of the present invention. With the embodiment illustrated in FIG. 3, the pipe 37 is removed, and a vacuum generator 45 directly engages with the opening 33 of the hollow member 32. Then, a vacuum generator drive pipe 42 that is connected with an air source (not illustrated) extends from the side of the vacuum generator 45. The vacuum generator 45 is a known device that generates vacuum according to Bernoulli's principle when air is supplied to the vacuum generator drive pipe 42. Consequently, with the embodiment illustrated in FIG. 3, a vacuum source, which is, for example, a vacuum pump, is not used.

In FIG. 3, the vacuum generator 45 is attached to the hollow member 32, so that the vacuum generator 45 is positioned comparatively close to the suction unit 26. With the first embodiment illustrated in FIG. 1 and others, it is necessary to vacuum the inside of the pipe 37 when the suction unit 26 is driven, and so the response of suction is not very good. However, with the embodiment illustrated in FIG. 3, the vacuum generator 45 is positioned near the suction unit 26, so that a vacuum effect is quickly applied to the suction unit 26 by means of the vacuum generator 45. By this means, it is possible to improve the response of the suction unit 26. In addition, it is possible to remove the flexible pipe 37 for driving the suction unit 26.

Figure 4:
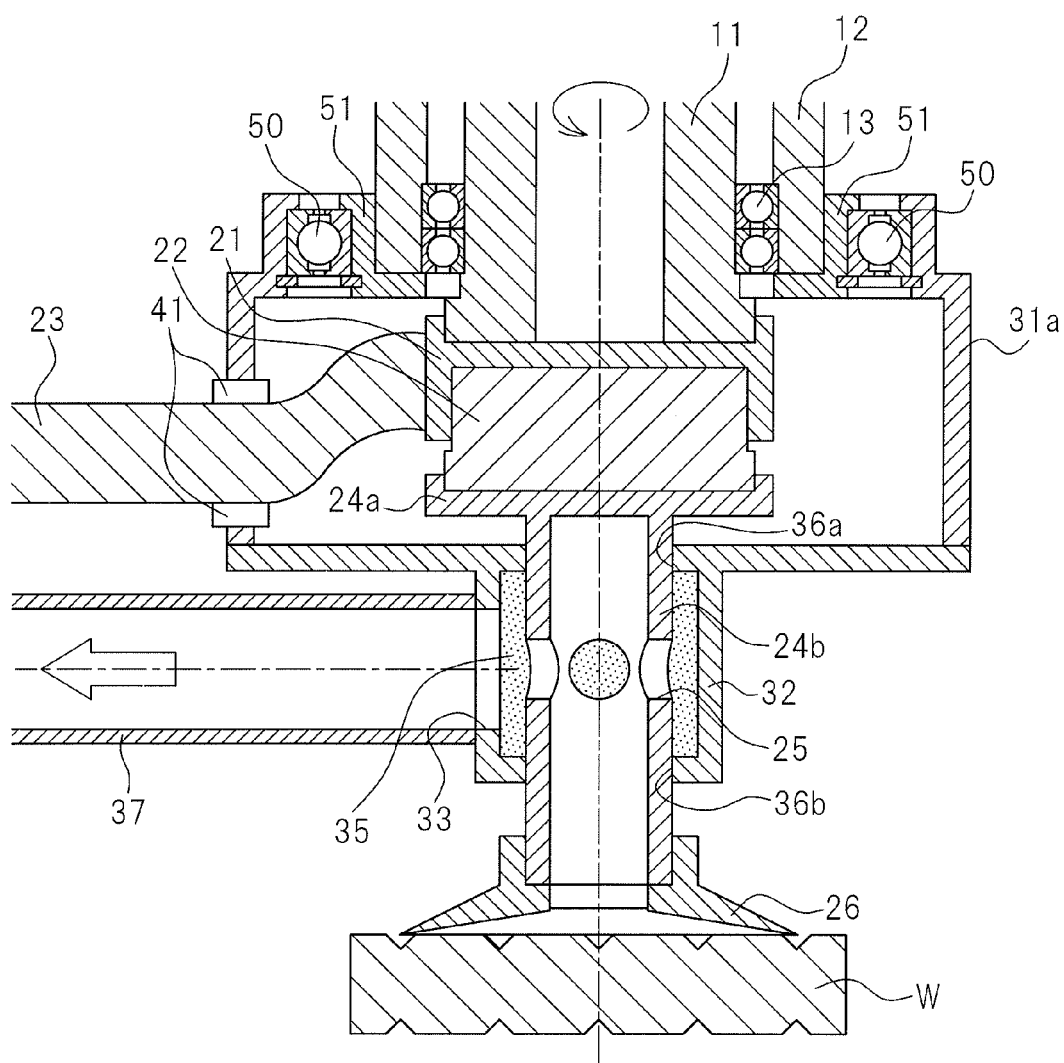
FIG. 4 is a cross sectional view of a robot hand based on a fourth embodiment of the present invention.

FIG. 4 is a cross sectional view of a robot hand according to a fourth embodiment of the present invention. With the embodiment illustrated in FIG. 4, the sealing members 38*a* and 38*b* are removed. Instead, holes 36*a* and 36*b* are placed adjacent to the hollow shaft unit 24*b*. The gaps between the holes 36*a* and 36*b* and the hollow shaft unit 24*b* are big enough to allow the hollow member 32 to rotate. Thus, it is obvious that, even in the event the sealing members 38*a* and 38*b* are removed, the substantially same effect as described above can be achieved.

Furthermore, in FIG. 4, the bearing 50 is placed between an attachment member 51 that is attached to the casing 12, and the hollow member connecting unit 31*a*. Consequently, the hollow member connecting unit 31*a* can rotate freely around the axis of the distal shaft 11. Consequently, even in the event where the distal shaft 11 of the robot 10 rotates, the hollow member connecting unit 31*a* does not rotate much. Therefore, it is possible to prevent the measurement instrument cable 23 from interfering with the peripheral equipment.

EFFECTS OF THE INVENTION

According to the first aspect, a hollow shaft unit connects a measurement instrument and a suction unit directly, and the hollow shaft unit communicates with a suction unit drive unit through an opening formed in its peripheral surface. By suctioning the air by means of the suction unit drive unit, even when airtightness cannot be maintained between the suction unit and the object to be held, it is possible to hold the object stably and measure the weight of the object adequately. Also, given that a hollow member is able to rotate around the hollow shaft unit, it is possible to rotate the object in a desired direction easily, without changing the suction function. Furthermore, given that the suction unit is separated from the suction unit drive unit by means of the hollow member, the suction unit drive unit, which is, for example the pipe, does not influence the measurement result of the weight of the object.

According to the second aspect, even if the object that is held by the suction unit rotates, it is possible to prevent the umbilical member from being swung around, and, furthermore, prevent the linear body from interfering with the peripheral equipment.

According to the third aspect, the response to apply vacuum to the suction unit can be improved.

When the areas of the two holes are not mutually equal, differences are produced between the forces produced in the holes by negative pressure. In contrast with this, when the areas of the two holes are mutually equal as with the fourth embodiment, the forces cancel each other and have no influence upon the measurement of the weight of the object.

According to the fifth aspect, even in the event the object is comparatively frail, it is possible to avoid the situation where part of the object enters inside the hollow member. This is especially effective when the object is food.

According to the sixth aspect, when the robot has a water-proof structure, it is possible to wash the robot hand with fluid in the state the robot hand is attached to the robot. This is especially effective when the object is food.

According to the seventh aspect, it is possible to easily avoid the situation where the umbilical member that drives the measurement instrument interferes with the peripheral equipment.

The object, features and advantages of the present invention and other objects, features and advantages should be clearer from the detailed descriptions of typical embodiments of the present invention illustrated in the accompanying drawings.

The invention claimed is:

1. A robot hand with a weight measurement function, that is attached to a robot arm and that has a function of measuring a weight of an object that is held by suction, the robot hand comprising:
   a measurement instrument that is attached to a distal end of a distal shaft of the robot arm and measures the weight of the object;
   a hollow shaft unit that is attached to a distal end of the measurement instrument coaxially with the distal shaft of the robot arm;
   a suction unit that is attached to a distal end of the hollow shaft unit and holds the object by suction;
   a hollow member that surrounds the hollow shaft unit in a circumferential direction, the hollow member and the hollow shaft unit configured such that the hollow member can rotate and move up and down relative to the hollow shaft unit;

a hollow member connecting unit that extends from a casing supporting the distal shaft of the robot arm and is connected to the hollow member; and a suction unit drive unit that is connected to the hollow member in a position corresponding to a peripheral surface of the hollow shaft unit and drives the suction unit, wherein the suction unit drive unit communicates with an inner space of the hollow shaft unit through at least one opening that is formed in the peripheral surface of the hollow shaft unit.

2. The robot hand as defined in claim 1, further comprising an umbilical member fixing unit that is attached to the hollow member connecting unit and fixes an umbilical member that drives the measurement instrument.

3. The robot hand as defined in claim 1, wherein the suction unit drive unit comprises a vacuum generator that is attached to the hollow member.

4. The robot hand as defined in claim 1, wherein:

two holes through which the hollow shaft unit penetrates are formed in the hollow member, the two holes configured enter into the hollow member during suction; and the two holes are made to have equal areas.

5. The robot hand as defined in claim 4, further comprising seal members that are placed between the two holes in the hollow member and the hollow shaft unit.

6. The robot hand as defined in claim 2, wherein the hollow member connecting unit is a water-proof structure that surrounds an entirety of the measurement instrument.

7. The robot hand as defined in claim 1, further comprising a bearing that is placed between the hollow member connecting unit and a casing that supports the distal shaft of the robot arm.

8. The robot hand as defined in claim 1, wherein the hollow member forms a chamber between the hollow member and the hollow shaft unit, the chamber having a suction opening that communicates with the suction unit drive unit, and having holes that lead towards an area outside of the chamber.

9. The robot hand as defined in claim 8, wherein the holes include a first hole arranged at an upper end of the chamber between the hollow member and the hollow shaft unit, and a second hole arranged at a lower end of the chamber between the hollow member and the hollow shaft unit.

10. The robot hand as defined in claim 9, wherein the first hole and the second hole have the same shape.

11. The robot hand as defined in claim 1, wherein the hollow member and the hollow shaft unit are configured such that the hollow member does not add weight to the hollow shaft unit.

12. The robot hand as defined in claim 1, wherein an annual chamber is formed between the hollow shaft unit and the hollow member over an entire length of the hollow member.

* * * * *